US010144054B2

(12) United States Patent
Ogura et al.

(10) Patent No.: US 10,144,054 B2
(45) Date of Patent: Dec. 4, 2018

(54) MIXING AND WATER ADJUSTING METHOD FOR FOUNDRY SAND

(71) Applicant: SINTOKOGIO, LTD., Nagoya-shi, Aichi (JP)

(72) Inventors: Yuichi Ogura, Toyokawa (JP); Koji Takishita, Toyokawa (JP); Hisashi Harada, Toyokawa (JP)

(73) Assignee: SINTOKOGIO, LTD., Nagoya-shi, Aichi (JP)

( * ) Notice: Subject to any disclaimer, the term of this patent is extended or adjusted under 35 U.S.C. 154(b) by 1032 days.

(21) Appl. No.: 14/391,036

(22) PCT Filed: Jun. 4, 2013

(86) PCT No.: PCT/JP2013/065906
§ 371 (c)(1),
(2) Date: Oct. 7, 2014

(87) PCT Pub. No.: WO2013/187341
PCT Pub. Date: Dec. 19, 2013

(65) Prior Publication Data

US 2015/0114259 A1 Apr. 30, 2015

(30) Foreign Application Priority Data

Jun. 13, 2012 (JP) ................................ 2012-134140
Jan. 11, 2013 (JP) ................................ 2013-003030

(51) Int. Cl.
*B28C 7/02* (2006.01)
*B28C 7/12* (2006.01)
(Continued)

(52) U.S. Cl.
CPC .......... *B22C 5/0409* (2013.01); *B22C 5/0463* (2013.01); *B22C 5/0472* (2013.01);
(Continued)

(58) Field of Classification Search
CPC ..... B22C 5/0409; B22C 19/04; B22C 5/0463; B22C 5/0472; B22C 5/18; B28C 7/024; B28C 7/0409; B28C 7/12
See application file for complete search history.

(56) References Cited

U.S. PATENT DOCUMENTS 3,249,970 A * 5/1966 Hartley ................. B22C 5/0472
307/116
3,778,035 A * 12/1973 MacKinney ............. B22C 5/08
366/17

(Continued)

FOREIGN PATENT DOCUMENTS

CN 1419481 5/2003
CN 101005911 7/2007

(Continued)

*Primary Examiner* — Charles Cooley
(74) *Attorney, Agent, or Firm* — Drinker Biddle & Reath LLP

(57) ABSTRACT

A mixing and adjusting method for foundry sand includes calculating a total supplied water amount until a compactability (CB) value of mixed sand becomes larger than a lower limit value of a target CB value range, determining the total supplied water amount as a predetermined amount of water associated with an electric resistance of the foundry sand, and determining a ratio of a variation in the CB value corresponding to an additionally supplied water amount from the additionally supplied water amount during an additional water pouring and the CB value of the mixed sand.

19 Claims, 4 Drawing Sheets

(51) Int. Cl.

| | |
|---|---|
| ***B22C 5/04*** | (2006.01) |
| ***B28C 7/04*** | (2006.01) |
| ***B22C 5/18*** | (2006.01) |
| ***B22C 19/04*** | (2006.01) |

(52) U.S. Cl.
CPC ................ *B22C 5/18* (2013.01); *B22C 19/04* (2013.01); *B28C 7/024* (2013.01); *B28C 7/0409* (2013.01); *B28C 7/12* (2013.01)

(56) References Cited

U.S. PATENT DOCUMENTS

| | | | | | |
|---|---|---|---|---|---|
| 4,291,379 | A * | 9/1981 | Cappelletto | B22C 5/00 | 700/271 |
| 4,304,289 | A * | 12/1981 | McMullen | B22C 5/08 | 164/154.4 |
| 4,569,025 | A * | 2/1986 | Eirich | B22C 5/00 | 366/132 |
| 4,881,819 | A * | 11/1989 | Blees | B28C 7/0409 | 366/140 |
| 5,702,181 | A * | 12/1997 | Wright | B28C 7/12 | 366/151.1 |
| 2008/0056060 | A1 * | 3/2008 | Harada | G01N 27/048 | 366/142 |
| 2015/0114259 | A1 * | 4/2015 | Ogura | B22C 5/0463 | 106/286.5 |
| 2018/0056375 | A1 * | 3/2018 | Ogura | B22C 9/02 | |

FOREIGN PATENT DOCUMENTS

| | | | |
|---|---|---|---|
| CN | 101715376 | | 5/2010 |
| JP | S55-106653 | | 8/1980 |
| JP | S56-117853 | | 9/1981 |
| JP | S57-209744 | A | 12/1982 |
| JP | S57-211541 | | 12/1982 |
| JP | S59-166342 | | 9/1984 |
| JP | S60-261640 | A | 12/1985 |
| JP | S61-14044 | A | 1/1986 |
| JP | H7-185735 | | 7/1995 |
| JP | H7-190975 | | 7/1995 |
| JP | H7-106423 | | 11/1995 |
| TW | 240824 | | 2/1995 |
| TW | 273724 | | 4/1996 |
| WO | 2013/187341 | A1 * | 12/2013 |

* cited by examiner

MIXING AND WATER ADJUSTING METHOD FOR FOUNDRY SAND

TECHNICAL FIELD

The present invention relates to a mixing (mulling) and adjusting method for foundry sand that is used when the foundry sand is mixed in a sand muller.

BACKGROUND ART

Foundry sand for molding has been mixed and adjusted by adding an additive such as bentonite and water to reclaimed sand. In such a mixing operation, the water content value of the mixed sand greatly affects the moldability of the mixed sand. Therefore, a skilled worker adjusts the water content manually by feel, for example by grasping the mixed sand. In an automatic machine, because there is an extremely meaningful correlation between the water content value of the mixed sand and the CB value (compactability value) of the foundry sand, the CB value is automatically measured to adjust the water content. When mixing (mulling) adjustment is performed in such an automatic machine, the shortage of water, that is, the difference between the actual and target water content of the mixed sand, is determined from the water content of sand charged into the sand muller, which is determined by a water sensor, and the lacking amount of water is supply in (primary supplied water). Then, the lacking CB value, that is, the difference between the actual CB value and target CB value, is determined by measuring the CB value during mixing, the water content corresponding to the lacking CB value is determined from the water content–CB value correlation factor, and the additional amount of water corresponding to the lacking water content is supply (secondary supplied water). The correction amount of the primary supplied water is then determined from the state of the past additional pouring of water, and the correction amount is reflected as feedback to the amount of the primary supplied water in the next mixing cycle. The above-described technique is disclosed in Japanese Patent Application Publication No. S61-14044.

CITATION LIST

Patent Literature

Patent Literature 1: Japanese Patent Application Publication No. S61-14044.

SUMMARY OF INVENTION

Technical Problem

When the water content of foundry sand or the like is measured with a water sensor, the water amount cannot be measured directly, and therefore the relationship between the value measured by the water sensor and the water content value measured manually with a water meter of an evaporation type should be measured a plurality of times in a range of water content of about 1%, and then the calibration should be performed to determine the correlation between the measured value of the water sensor and the water content value measured with the evaporation-type water meter. This calibration should be performed, as appropriate, since the correlation between the measured value of the water sensor and the water content value measured with the water meter changes depending on the state of the detection unit of the water sensor, or changes in the state of the reclaimed sand caused by changes in the form and weight of the casting to be produced and the amount of the core material used. This calibration operation is complex and places a large burden on the operator or controller. Further, the correlation between the value measured by the water sensor and the water content value measured by the evaporation-type water meter is also applied to the process described in Japanese Patent Application Publication No. S61-14044 in which the correction amount of the primary supplied water is determined from the amount of water additionally supply in the previous cycles and the determined correction amount is reflected as feedback to the amount of primary supplied water of the next mixing cycle. Therefore, the aforementioned calibration should be periodically performed to ensure that the feedback of the correction amount is performed with good accuracy.

The present invention has been created to resolve the above-described problem and it is an object thereof to provide a mixing and adjusting method for foundry sand in which calibration performed to determine the correlation between the value measured by the water sensor and the water content value measured by the evaporation-type water meter is unnecessary and no complex calibration operation should be performed by the operator or controller.

Solution to Problem

According to one aspect of the present invention, the above-described object is attained by a mixing and adjusting method for foundry sand that uses a sand muller for the foundry sand, having weight measuring means for measuring a weight of the foundry sand to be mixed, water content measuring means for measuring a water content of the foundry sand to be mixed, water pouring means for pouring water into the foundry sand, and CB value measuring means for measuring a CB value of the foundry sand during mixing, the method including: a weight measurement step of measuring the weight of the foundry sand that is to be mixed, with the weight measuring means; a water content measurement step of measuring the water content of the foundry sand that is to be mixed, with the water content measuring means; a charging step of charging the foundry sand for which the weight and the water content have been measured into the sand muller; a primary water pouring step of pouring water in an amount less than an estimated supplied water amount with the water pouring means into the foundry sand charged into the sand muller; a primary supplied water mixing step of mixing the foundry sand subjected to the primary water pouring; a CB value measurement step of measuring the CB value of the mixed sand subjected to the primary supplied water mixing, with the CB value measuring means; an additional water pouring step in which when the measured CB value of the mixed sand is equal to or less than a lower limit value of a target CB value range, water in an amount less than an amount obtained by subtracting an amount of water supply before the measurement time from the estimated supplied water amount is additionally supply into the mixed sand; an additionally supplied water mixing step of mixing again the mixed sand subjected to the additional water pouring; and an additional CB value measurement step of measuring the CB value of the mixed stand subjected to the additionally supplied water mixing, with the CB value measuring means, wherein the additional water pouring step, the additionally supplied water mixing step, and the additional CB value measurement step are repeated till the CB value of the mixed sand measured in the additional CB value measurement step becomes larger than the lower limit value of the target CB value range; a total amount of water supply till the CB value of the mixed sand measured in the additional CB value measurement step becomes larger than the lower limit value of the target CB value range is calculated, and the total supplied water amount is determined as a necessary supplied water amount corresponding to the water content in the foundry sand that is to be mixed, which has been measured by the water content measuring means; and a ratio of a variation in the CB value corresponding to the additionally supplied water amount is determined from the additionally supplied water amount during the additional water pouring and the CB value of the mixed sand subjected to the additionally supplied water mixing.

In the mixing and adjusting method for foundry sand according to another aspect of the present invention, an amount of water supply in one cycle may decrease as the number of water pouring cycles increases after the additional water pouring has been performed after the primary water pouring.

A mixing and adjusting method for foundry sand according to yet another aspect of the present invention is a mixing and adjusting method for foundry sand performed on the basis of the necessary supplied water amount corresponding to the water content in the foundry sand that is to be mixed, which has been measured by the water content measuring means, and the ratio of a variation in the CB value corresponding to the additionally supplied water amount, which have been determined by implementing the mixing and adjusting method for foundry sand according to claim 1. This method according to yet another aspect of the present invention may include: a weight measurement step of measuring the weight of the foundry sand that is to be mixed, with the weight measuring means; a water content measurement step of measuring the water content of the foundry sand that is to be mixed, with the water content measuring means; a charging step of charging the foundry sand for which the weight and the water content have been measured into the sand muller; a primary water pouring step of pouring water in an amount deter mined on the basis of the necessary supplied water amount corresponding to the water content in the foundry sand that is to be mixed, which has been measured by the water content measuring means, into the foundry sand charged into the sand muller; a primary supplied water mixing step of mixing the foundry sand subjected to the primary water pouring; a CB value measurement step of measuring the CB value of the mixed sand subjected to the primary supplied water mixing, with the CB value measuring means; a variation ratio calculation step in which when the measured CB value of the mixed sand is equal to or less than a lower limit value of a target CB value range, a difference between the CB value of the mixed sand subjected to the primary supplied water mixing and the target CB value is calculated as a ratio of a variation in the CB value; a variation-ratio-corresponding additional water pouring step of determining an additionally supplied water amount corresponding to the calculated ratio of a variation in the CB value on the basis of the ratio of a variation in the CB value corresponding to the additional supplied water amount and additionally pouring water in the determined additional supplied water amount into the mixed sand; and an additional supplied water mixing step of mixing again the mixed sand subjected to the additional water pouring.

In the mixing and adjusting method for foundry sand according to yet another aspect of the present invention, an amount of water supply in the primary water pouring step and an amount of water supply in the additional water pouring step may be made proportional to the weight of the foundry sand that is to be mixed, which has been measured by the weight measuring means.

In the mixing and adjusting method for foundry sand according to yet another aspect of the present invention, the necessary supplied water amount corresponding to the water content of the foundry sand that is to be mixed, which has been measured by the water content measuring means, may be corrected by a difference between the measured CB value of the mixed sand subjected to the primary supplied water mixing, which has been measured by the CB value measuring means, and an estimated CB value of the mixed sand subjected to the primary supplied water mixing, which is determined on the basis of the necessary supplied water amount corresponding to the water content of the foundry sand that is to be mixed, which has been measured by the water content measuring means.

In the mixing and adjusting method for foundry sand according to yet another aspect of the present invention, an intercept and an inclination of a function of the necessary supplied water amount versus the water content of the foundry sand that is to be mixed, which has been measured by the water content measuring means, may be corrected upon the correction of the necessary supplied water amount corresponding to the water content of the foundry sand that is to be mixed, which has been measured by the water content measuring means.

The mixing and adjusting method for foundry sand according to yet another aspect of the present invention may include: an additional CB value measurement step of measuring the CB value of the mixed sand subjected to the additionally supplied water mixing, with the CB value measuring means; a CB value variation ratio calculation step of calculating the ratio of a variation in the measured CB value of the mixed sand caused by the additionally supplied water; an average value calculation step of determining an average value of the ratios of variations in the measured CB value of the mixed sand caused by the additionally supplied water that have heretofore been calculated; and a correction step of correcting the ratio of a variation in the CB value corresponding to the additionally supplied water amount by a difference between the average value of the ratios of variations in the measured CB value of the mixed sand caused by the additionally supplied water that have heretofore been calculated and the calculated ratio of a variation in the measured CB value of the mixed sand caused by the additionally supplied water.

In the mixing and adjusting method for foundry sand according to yet another aspect of the present invention, a correction value for correcting the ratio of a variation in the CB value corresponding to the additionally supplied water amount may be multiplied by a factor of 0.1 to 0.8.

In the mixing and adjusting method for foundry sand according to yet another aspect of the present invention, the water pouring means for pouring water into the foundry sand may be provided with a digital flow meter communicated with a water source and an electromagnetic valve communicated with the digital flow meter, and when water is supply into the foundry sand, a leak water amount caused by operation delay occurring when the electromagnetic valve is closed may be corrected for each end of water pouring operation by a difference between a target amount of water that is to be supply through the digital flow meter and an accumulated flow rate measured by the digital flow meter.

The mixing and adjusting method for foundry sand according to yet another aspect of the present invention may include: a storage step of storing in a storage means, for each batch mixing, the water content of the foundry sand that is to be mixed, which has been measured by the water content measuring means, and an adjusted primary supplied water amount that is a value obtained by adding the primary supplied water amount to a value obtained by dividing a difference between the measured CB value of the mixed sand subjected to the primary supplied water mixing, which has been measured by the CB value measuring means, and the target CB value by the ratio of a variation in the CB value corresponding to the additionally supplied water amount; and a linear approximation step of performing linear approximation from a distribution of the water content of the foundry sand that is to be mixed, which has been measured by the water content measuring means, and the adjusted primary supplied water amount that have been stored in the storage means.

In the mixing and adjusting method for foundry sand according to yet another aspect of the present invention, the primary supplied water amount during mixing of the next cycle may be corrected by the difference between the measured CB value of the mixed sand subjected to the primary supplied water mixing, which has been measured by the CB value measuring means, and the estimated CB value of the mixed sand subjected to the primary supplied water mixing, which is determined on the basis of the necessary supplied water amount corresponding to the water content of the foundry sand that is to be mixed, which has been measured by the water content measuring means.

Advantageous Effects of Invention

The mixing and adjusting method for foundry sand according to the aforementioned one aspect of the present invention uses a sand muller for the foundry sand, having weight measuring means for measuring a weight of the foundry sand to be mixed, water content measuring means for measuring a water content of the foundry sand to be mixed, water pouring means for pouring water into the foundry sand, and CB value measuring means for measuring a CB value of the foundry sand during mixing, and this method includes:

a weight measurement step of measuring the weight of the foundry sand that is to be mixed, with the weight measuring means;

a water content measurement step of measuring the water content of the foundry sand that is to be mixed, with the water content measuring means;

a charging step of charging the foundry sand for which the weight and the water content have been measured into the sand muller;

a primary water pouring step of pouring water in an amount less than an estimated supplied water amount with the water pouring means into the foundry sand charged into the sand muller;

a primary supplied water mixing step of mixing the foundry sand subjected to the primary water pouring;

a CB value measurement step of measuring the CB value of the mixed sand subjected to the primary supplied water mixing, with the CB value measuring means;

an additional water pouring step in which when the measured CB value of the mixed sand is equal to or less than a lower limit value of a target CB value range, water in an amount less than an amount obtained by subtracting an amount of water supply before the measurement time from the estimated supplied water amount is additionally supply into the mixed sand;

an additionally supplied water mixing step of mixing again the mixed sand subjected to the additional water pouring; and an additional CB value measurement step of measuring the CB value of the mixed stand subjected to the additionally supplied water mixing, with the CB value measuring means, wherein the additional water pouring step, the additionally supplied water mixing step, and the additional CB value measurement step are repeated till the CB value of the mixed sand measured in the additional CB value measurement step becomes larger than the lower limit value of the target CB value range;

a total amount of water supply till the CB value of the mixed sand measured in the additional CB value measurement step becomes larger than the lower limit value of the target CB value range is calculated, and the total supplied water amount is determined as a necessary supplied water amount corresponding to the water content in the foundry sand that is to be mixed, which has been measured by the water content measuring means; and a ratio of a variation in the CB value corresponding to the additionally supplied water amount is determined from the additionally supplied water amount during the additional water pouring and the CB value of the mixed sand subjected to the additionally supplied water mixing. Therefore, the calibration performed to find the correlation between the value measured by the water sensor and the water content measured by the evaporation-type water meter is unnecessary and no complex calibration operation should be performed by the operator or controller.

DESCRIPTION OF EMBODIMENTS

Figure 1:
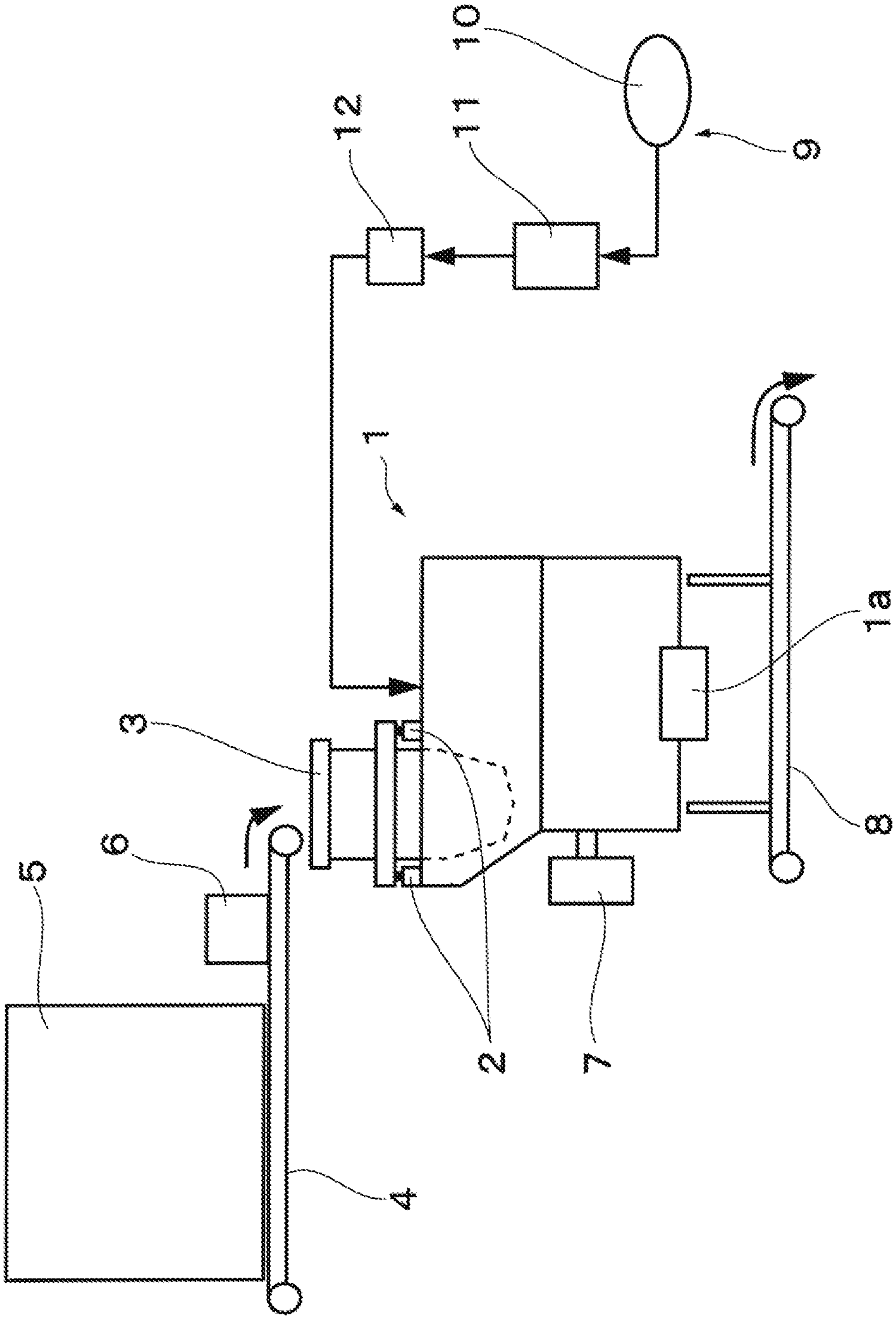
FIG. 1 is a schematic diagram illustrating the sand muller according to the present embodiment and auxiliary equipment thereof.

An embodiment relating to one aspect of the present invention will be explained below with reference to the appended drawings. In FIG. 1, the reference numeral 1 stands for a sand muller for foundry sand (green sand in the present embodiment). In the present embodiment, a mix muller is used as the sand muller 1. A load meter (load cell) 2 serving as weight measuring means for measuring the weight of the foundry sand that is to be mixed is mounted on the upper section of the sand muller 1, and a sand metering hopper 3 is installed on the load meter 2. A gate (not shown in the figure) is mounted on the lower section of the sand metering hopper 3 and makes it possible to supply the foundry sand metered by the sand metering hopper 3 into the sand muller 1.

The foundry sand as referred to in the present embodiment is a sand to be used as a casting mold material for producing a casting mold. The mixed sand as referred to herein is the foundry sand that has been charged into the sand muller and is being mixed or has been mixed. The CB value (compactability value) as referred to in the present embodiment is a characteristic value of the foundry sand. The compactability value stands for a value (represented in percents) obtained by passing the foundry sand through a sieve (3 mm mesh), introducing into a test tube (height 100 mm), scratching off the foundry sand located on the upper surface, compacting three times with a standard rammer or pressurizing by squeezing under 0.98 MPa, and dividing the sinking depth by the original height.

A sand feeding belt conveyor 4 is installed above the sand metering hopper 3, and a recovery sand hopper 5 is installed in the upper section at the proximal end side of the sand feeding belt conveyor 4. An electric resistance meter 6 serving as water content measuring means for measuring the water content of the foundry sand that is to be mixed is installed in the upper section at the distal end side of the sand feeding belt conveyor 4. The electric resistance of the foundry sand is measured with the electric resistance meter 6 serving as water content measuring means because the electric resistance of the foundry sand is inversely proportional to the water content of the foundry sand, and the state of the water amount in the foundry sand can be determined by measuring the electric resistance.

CB value measuring means 7 for measuring the CB value (compactability value) of the foundry sand during mixing (mulling) is attached to the side wall of the sand muller 1. A sand carry-out belt conveyor 8 is installed below the sand muller 1.

The sand muller 1 is also provided with water pouring means 9 for pouring water into the foundry sand. The water pouring means 9 includes a digital flow meter 11 communicated with a water source 10, and an electromagnetic valve 12 communicated with the digital flow meter 11. The electromagnetic valve 12 is also communicated with the sand muller 1.

Figure 3:
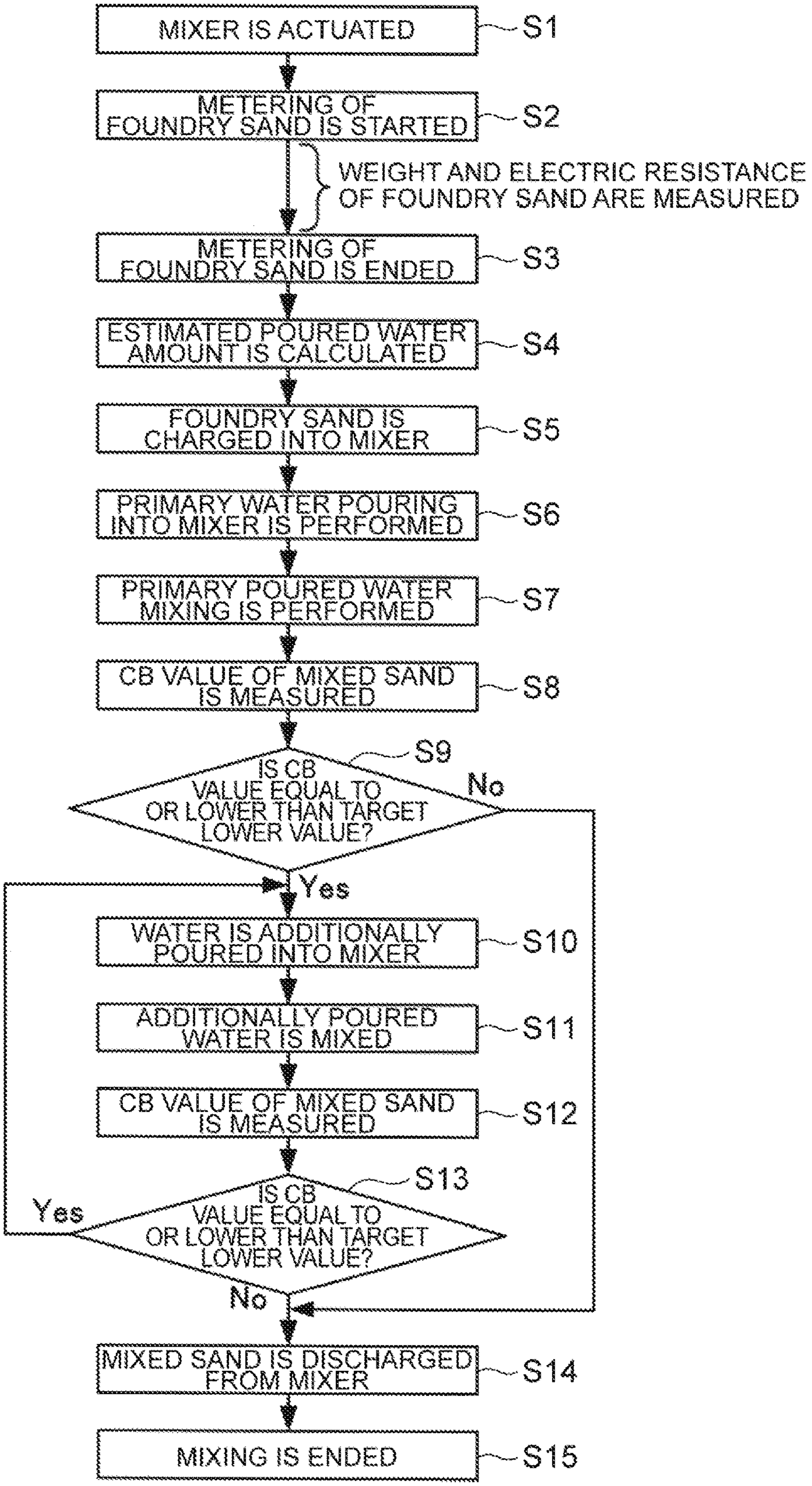
FIG. 3 is a flowchart illustrating the flow of the preceding mixing and adjusting method.

The operation of the apparatus configured as described hereinabove will be explained below. FIG. 3 is a flowchart illustrating the flow of operations. First, the sand muller 1 is actuated (S1). Then, the sand feeding belt conveyor 4 is actuated. As a result, the foundry sand located in the recovery sand hopper 5 is scraped and the predetermined amount of foundry sand is charged from the distal end of the sand feeding belt conveyor 4 into the sand metering hopper 3 (S2). In this case, the weight of the foundry sand charged into the sand metering hopper 3 is measured with the load meter 2, and once the weight of the foundry sand charged into the sand metering hopper 3 reaches the target weight value, the sand feeding belt conveyor 4 is stopped (S3).

The electric resistance of the metered foundry sand is measured with the electric resistance meter 6 within a period of time after the sand feeding belt conveyor 4 has been actuated and before it is stopped, that is, from the start to the end of the sand metering operation. The average value of the electric resistance within a period of time from the start to the end of the sand metering operation is taken as the electric resistance of the metered foundry sand.

Figure 2:
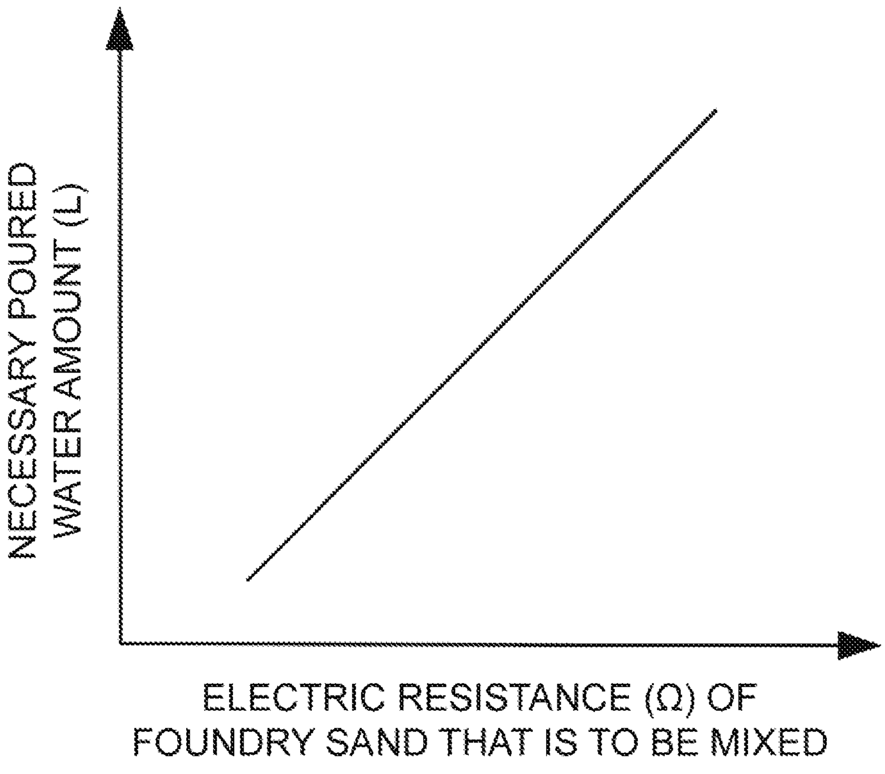
FIG. 2 is a functional graph of the necessary supplied water amount versus the electric resistance of the foundry sand that is to be mixed, which has been determined on the basis of past results of foundry sand mixing.

Then, the estimated supplied water amount is calculated from a functional graph (see FIG. 2) of the necessary supplied water amount versus the electric resistance of the foundry sand that is to be mixed, which has been determined on the basis of past results of foundry sand mixing (mulling) (S4). The gate mounted on the lower section of the sand metering hopper 3 is then opened, and the foundry sand located in the sand metering hopper 3, that is, the foundry sand for which the weight and electric resistance have been measured, is charged into the sand muller 1 (S5). Once the charging of the foundry sand is ended, the gate is closed.

Primary water pouring is then performed with the water pouring means 9 into the foundry sand charged into the sand muller 1 (S6). In the primary water pouring step, water is supply in an amount less than the estimated supplied water amount, thereby leaving room for the additional water pouring, such as secondary or tertiary water pouring. It is preferred that the following condition be fulfilled: primary supplied water amount=(estimated supplied water amount)×(50% to 80%).

When the water pouring means 9 is actuated during water pouring, first, the electromagnetic valve 12 is opened and pouring of water from the water source 10 into the sand muller 1 through the digital flow meter 11 and the electromagnetic valve 12 is started. The amount of water flowing during the water pouring process is measured with the digital flow meter 11, and the electromagnetic valve 12 is closed and water pouring is ended once the supplied water amount reaches a target amount.

The primary supplied water mixing is then performed in which the foundry sand subjected to the primary water pouring is mixed (S7). The CB value of the mixed sand gradually increases in the primary supplied water mixing process, but once this increase stops and a state with a stable CB value is assumed, the CB value of the mixed sand subjected to the primary supplied water mixing is measured with the CB value measuring means 7 (S8). Typically, the CB value is stabilized where the mixing is performed for about 90 sec to 120 sec after the primary water pouring. The CB value is measured by introducing the predetermined amount of the mixed sand from inside the sand muller 1 into the CB value measuring means 7.

Then, it is determined whether or not the measured CB value of the foundry sand subjected to the primary supplied water mixing is equal to or less than the lower limit value of the target CB value range (S9). Since the primary supplied water amount is less than the estimated supplied water amount, the CB value does not become larger than the lower limit value of the target CB value range, but in the case in which it becomes larger than the lower limit value, the mixed sand located inside the sand muller 1 is discharged from a sand discharge port 1*a* of the sand muller 1 (S14) and the mixing is ended (S15). The discharged mixed sand is conveyed to the next step (not shown in the figure) by the sand carry-out belt conveyer 8 operating below the sand discharge port 1*a*.

When the measured CB value of the mixed sand subjected to the primary supplied water mixing is equal to or less than the lower limit value of the target CB value range, water is additionally supply by the water pouring means 9 into the mixed sand (S10). In the additional water pouring step, water is additionally supply in an amount less than the amount obtained by subtracting the amount of water supply before the CB value measurement time from the estimated supplied water amount. It is preferred that the following condition be fulfilled: additionally supplied water amount=[(estimated supplied water amount)−(amount of water supply before the CB value measurement time)]×(50% to 80%).

When the additional water pouring is performed at least once after the primary water pouring, it is preferred that the amount of water supply in one cycle decrease gradually with the increase in the number of water pouring cycles. For example, where secondary and tertiary additional water pouring are performed after the primary water pouring, the following condition is fulfilled: (primary supplied water amount)>(secondary supplied water amount)>(tertiary supplied water amount). The merit of gradually decreasing the amount of water supply in one cycle with the increase in the number of water pouring cycles when the additional water pouring is performed at least once after the primary water pouring is that the state of variations in the CB value corresponding to the supplied water mount in a wide range can be determined.

The additionally supplied water mixing is then performed in which the foundry sand subjected to the additional water pouring is mixed again (S11). The CB value of the mixed sand gradually increases also in the additionally supplied water mixing step, but once this increase stops and a state with a stable CB value is assumed, the CB value of the mixed sand subjected to the additionally supplied water mixing is measured with the CB value measuring means 7 (S12). Typically, the CB value is stabilized where the mixing is performed for about 30 sec to 60 sec after the additional water pouring.

Then, it is determined whether or not the measured CB value of the foundry sand subjected to the additionally supplied water mixing is equal to or less than the lower limit value of the target CB value range (S13). In the case in which the CB value is larger than the lower limit value of the target CB value range, the mixed sand located inside the sand muller 1 is discharged from the sand discharge port 1*a* of the sand muller 1 (S14) and the mixing is ended (S15).

When the measured CB value of the mixed sand subjected to the additionally supplied water mixing is equal to or less than the lower limit value of the target CB value range, the above-described additional water pouring step (S10) in which water is additionally supply in an amount less than the amount obtained by subtracting the amount of water supply before the CB value measurement time from the estimated supplied water amount, the additionally supplied water mixing step (S11) in which the mixed sand subjected to the additional water pouring is mixed again, and the additional CB value measurement step (S12) in which the CB value of the mixed sand subjected to the additionally supplied water mixing is measured by the CB value measuring means 7 are repeated till the measured CB value of the mixed sand becomes larger than the lower limit value of the target CB value range.

The following contents can be determined by mixing and adjusting the foundry sand in the above-describe manner. The total amount of water supply till the measured CB value of the mixed sand becomes larger than the lower limit value of the target CB value range can be calculated and this total supplied water amount can be determined as a necessary supplied water mount corresponding to the electric resistance of the foundry sand that is to be mixed, which has been measured by the electric resistance meter 6. Further, the ratio of variation in the CB value corresponding to the additionally supplied water amount can be determined from the amount of water additionally supply when the additional water pouring is performed and the CB value of the mixed sand subjected to the additionally supplied water mixing.

Where such contents are determined, the primary water pouring and additional water pouring corresponding to the target CB value (target CB value range) can be performed in the subsequent mixing of the foundry sand with a high accuracy by implementing a separate mixing and adjusting method that is somewhat different from the above-described mixing and adjusting method (preceding mixing and adjusting method) on the basis of the determined contents. Such separate mixing and adjusting method is explained below. Since the state of the foundry sand varies depending on casting conditions or the like, where the mixing is continued, the necessary supplied water amount corresponding to the electric resistance of the foundry sand that is to be mixed, which has been measured with the electric resistance meter 6, and the ratio of a variation in the CB value corresponding to the additionally supplied water amount also vary. Therefore, the correction method therefor is also explained below.

Figure 4:
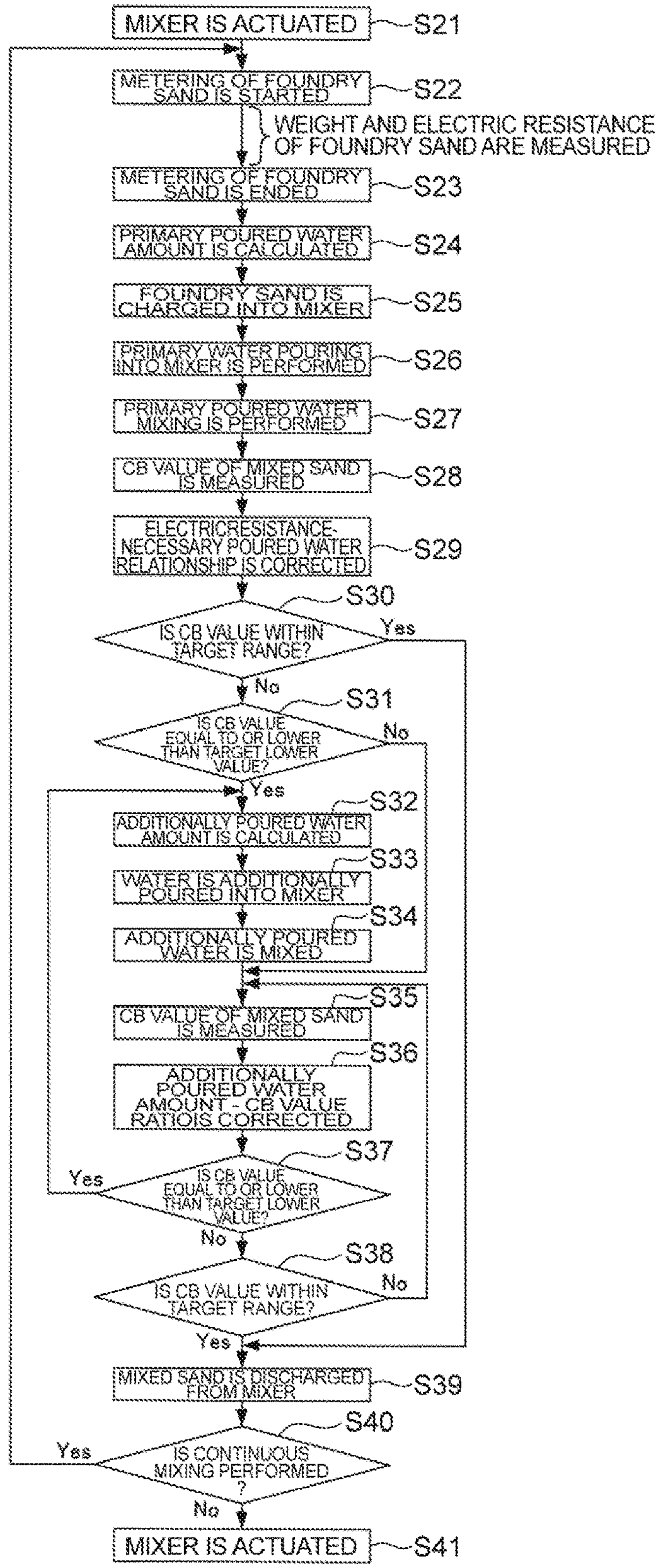
FIG. 4 is a flowchart illustrating the flow of the separate mixing and adjusting method.

FIG. 4 is a flowchart illustrating the flow of the separate mixing and adjusting method. In the separate mixing and adjusting method, first, the sand muller 1 is actuated (S21). Then, the sand feeding belt conveyor 4 is actuated. As a result, the foundry sand located in the recovery sand hopper 5 is scraped and the predetermined amount of foundry sand is charged from the distal end of the sand feeding belt conveyor 4 into the sand metering hopper 3 (S22). In this case, the weight of the foundry sand charged into the sand metering hopper 3 is measured with the load meter 2, and once the weight of the foundry sand charged into the sand metering hopper 3 reaches the target weight value, the sand feeding belt conveyor 4 is stopped (S23).

The electric resistance of the metered foundry sand is measured with the electric resistance meter 6 within a period of time after the sand feeding belt conveyor 4 has been actuated and before it is stopped, that is, from the start to the end of the sand metering operation. The average value of the electric resistance within a period of time from the start to the end of the sand metering operation is taken as the electric resistance of the metered foundry sand.

Then, the primary supplied water amount is determined on the basis of the necessary supplied water amount corresponding to the electric resistance of the foundry sand that is to be mixed, which has been measured by the electric resistance meter 6 (referred to hereinbelow as "electric resistance–necessary supplied water amount function") (S24). This necessary supplied water amount has been determined in the preceding mixing and adjusting method. More specifically, the primary supplied water amount corresponding to the target CB value is calculated from the "electric resistance–necessary supplied water amount function".

The gate mounted on the lower section of the sand metering hopper 3 is then opened, and the foundry sand located in the sand metering hopper 3, that is, the foundry sand for which the weight and electric resistance have been measured, is charged into the sand muller 1 (S25). Once the charging of the foundry sand is ended, the gate is closed.

Primary water pouring is then performed with the water pouring means 9 into the foundry sand charged into the sand muller 1 (S26). In the primary water pouring step, water is supply in a primary supplied water amount determined on the basis of the "electric resistance–necessary supplied water amount function". When the water pouring means 9 is actuated during water pouring, first, the electromagnetic valve 12 is opened and pouring of water from the water source 10 into the sand muller 1 through the digital flow meter 11 and the electromagnetic valve 12 is started. The amount of water flowing during the water pouring process is measured with the digital flow meter 11, and the electromagnetic valve 12 is closed and water pouring is ended once the supplied water amount reaches a target amount.

The primary supplied water mixing is then performed in which the foundry sand subjected to the primary water pouring is mixed (S27). The CB value of the mixed sand gradually increases in the primary supplied water mixing step, but once this increase stops and a state with a stable CB value is assumed, the CB value of the mixed sand subjected to the primary supplied water mixing is measured with the CB value measuring means 7 (S28). Typically, the CB value is stabilized where the mixing is performed for about 90 sec to 120 sec after the primary water pouring. The CB value is measured by introducing the predetermined amount of the mixed sand from inside the sand muller 1 into the CB value measuring means 7.

Then, the "electric resistance–necessary supplied water amount function" is corrected by comparing the measured CB value (referred to hereinbelow as primary supplied water CB value) of the mixed sand subjected to the primary supplied water mixing, which has been measured with the CB value measuring means 7, with the estimated CB value (referred to hereinbelow as primary supplied water estimated CB value) of the mixed sand subjected to the primary supplied water mixing, which is determined on the basis of the "electric resistance–necessary supplied water amount function" (S29).

More specifically, first, the difference between the primary supplied water estimated CB value and the primary supplied water CB value is determined, and then the supplied water amount corresponding to this difference in CB value is determined from a ratio (referred to hereinbelow as "additionally supplied water amount–CB value ratio") of variations in the CB value corresponding to the additionally supplied water amount, which has been determined by the preceding mixing and adjusting method.

Where the difference between the primary supplied water estimated CB value and the primary supplied water CB value is positive, the supplied water amount corresponding to the difference in the CB value is added to the intersect of the aforementioned "electric resistance–necessary supplied water amount function". Where the difference between the primary supplied water estimated CB value and the primary supplied water CB value is negative, the supplied water amount corresponding to the difference in CB value is subtracted from the intersect of the aforementioned "electric resistance–necessary supplied water amount function". The intersect of the aforementioned "electric resistance–necessary supplied water amount function" is thus corrected. The corrected value of the intersect becomes effective from the mixing of the next cycle. In order to avoid abrupt variations in the supplied water amount, it is preferred that the amount (correction value to be used for correction) that is added to or subtracted from the intersect of the aforementioned "electric resistance–necessary supplied water amount function" be multiplied by a factor of 0.1 to 0.8.

The inclination of the "electric resistance–necessary supplied water amount function" is then corrected. This correction is explained in detail below. The correction value of the intersect of the "electric resistance–necessary supplied water amount function" is stored together with the measured electric resistance in a storage means (not shown in the figure). The measured electric resistance is compared with the average value (referred to hereinbelow as average electric resistance) of electric resistance that have heretofore been measured. Where the measured electric resistance is higher than the average electric resistance, the correction value of the intersect of the "electric resistance–necessary supplied water amount function" is multiplied by +1, and where the measured electric resistance is lower than the average electric resistance, the correction value of the intersect of the "electric resistance–necessary supplied water amount function" is multiplied by −1. The resultant value is then divided by the average electric resistance and saved as a gradient inclination value of the "electric resistance–necessary supplied water amount function" in the storage means.

The gradient inclination value is then averaged, the resultant value is taken as the average gradient inclination value, and the inclination of the "electric resistance–necessary supplied water amount function" is corrected. The correction of the inclination of the "electric resistance–necessary supplied water amount function" is performed by adding the average gradient inclination value to the inclination. Thus, where the average gradient inclination value is positive, the inclination is increased, and where the average gradient inclination value is negative, the inclination is decreased. The inclination of the "electric resistance–necessary supplied water amount function." is thus corrected. The corrected value of the inclination becomes effective from the mixing of the next cycle. The correction amount of the inclination of the "electric resistance–necessary supplied water amount function" is preferably about 50% to 100% of the average gradient inclination value. The average electric resistance and average gradient inclination value are preferably determined by averaging the range spanning back about 10 to 50 points from the newest data.

Then, it is determined whether or not the primary supplied water CB value is within the target CB value range (S30). Where the primary supplied water CB value is within the target CB value range, the mixed sand located in the sand muller 1 is discharged from the sand discharge port 1*a* of the sand muller 1 (S39), the continuous mixing is determined to be unnecessary (S40), and the mixing is ended (S41). The discharged mixed sand is conveyed to the next step (not shown in the figure) by the sand carry-out belt conveyer 8 operating below the sand discharge port 1*a*.

Where the primary supplied water CB value is not within the target CB value range, it is determined whether or not the primary supplied water CB value is equal to or lower than the lower limit value of the target CB value range (S31). Where the primary supplied water CB value is larger than the lower limit value of the target CB value range, the primary supplied water CB value is outside the target CB value range and larger than the upper limit value of the target CB value range. Therefore, the steps preceding the below-described additional CB value measurement step (S35) for the mixed sand after the additional water pouring are skipped and only this and subsequent steps are implemented.

Where the primary supplied water CB value is equal to or lower than the lower limit value of the target CB value range, a difference between the primary supplied water CB value and the target CB value is determined and the supplied water amount corresponding to the difference in CB value is calculated on the basis of the "additionally supplied water amount–CB value ratio" and determined as the additionally supplied water amount (S32). Then water is additionally supply with the water pouring means 9 into the mixed sand in the determined additionally supplied water amount (S33).

The additionally supplied water mixing is then performed in which the foundry sand subjected to the additional water pouring is mixed again (S34). The CB value of the mixed sand gradually increases also in the additionally supplied water mixing step, but once this increase stops and a state with a stable CB value is assumed, the CB value of the mixed sand subjected to the additionally supplied water mixing is measured with the CB value measuring means 7 (S35). Typically, the CB value is stabilized where the mixing is performed for about 30 sec to 60 sec after the additional water pouring.

After the additional water pouring has been performed, the ratio of a variation in the measured CB value of the mixed sand caused by the additional water pouring is calculated and stored in a storage means (not shown in the figure). The average value of the ratios of variations in the measured CB values of the mixed sand caused by the additional water pouring that have been heretofore calculated is then determined, and the aforementioned "additionally supplied water amount–CB value ratio" is corrected by the difference between the average value and the ratio of a variation in the measured CB value of the mixed sand caused by the additional water pouring (S36). The corrected value of this correction becomes effective from the additional water pouring of the next cycle. In order to avoid abrupt variations in the supplied water amount, it is preferred that the correction value be multiplied by a factor of 0.1 to 0.8. The average value of the ratios of variations in the measured CB values of the mixed sand caused by the additional water pouring referable is preferably determined by averaging the range spanning back about 10 to 50 points from the newest data.

Then, it is determined whether or not the measured CB value of the mixed sand subjected to the additionally supplied water mixing is equal to or lower than the lower limit value of the target CB value range (S37). Where the measured CB value of the mixed sand subjected to the additionally supplied water mixing is equal to or lower than the lower limit value of the target CB value range, the processing flow returns to the above-described step (S32) of calculating the additionally supplied water amount, and the subsequent steps (S33 to S37) are repeated till the measured CB value of the mixed sand becomes larger than the lower limit value of the target CB value range.

Where the CB value is larger than the lower limit value of the target CB value range, it is determined whether or not the CB value is within the target CB value range (S38). Where the CB value is within the target CB value range, the mixed sand located in the sand muller 1 is discharged from the sand discharge port 1*a* of the sand muller 1 (S39). Where the CB value is outside the target CB value range, a state is assumed in which the CB value is larger than the lower limit value of the target CB value range and outside the target CB value range, that is, larger than the upper limit value of the target CB value range. Therefore, the processing flow returns to the above-described additional CB value measurement step (S35) performed after the additional water pouring, and the subsequent steps (S36 to S38) are repeated till the measured CB value of the mixed sand becomes within the target CB value range. This operation is performed because where the mixing time is extended, the water contained in the mixing step is evaporated and the CB value gradually decreases.

When the mixed sand located in the sand muller 1 is discharged from the sand discharge port 1*a* of the sand muller 1, it is determined whether or not continuous mixing is to be performed (whether to continue the mixing process) (S40). When continuous mixing is to be performed, the processing returns to the step (S22) of sand metering and the subsequent steps (S23 to S40) are repeated. Where continuous mixing is not to be performed, the mixing is ended (S41).

In the above-described embodiment, the operation of the water pouring means 9 during water pouring is described by a simple example, but this example is not limiting. Thus, when water is supply into the foundry sand, the leak water amount caused by operation delay occurring when the electromagnetic valve 12 is closed may be corrected for each end of the water pouring operation by the difference between the target amount of water that is supply via the digital flow meter 11 and the accumulated flow rate measured by the digital flow meter 11. The advantage of such a correction is that the accurate amount of water can be supply even when the flow rate fluctuates due to the accumulation of dirt on the inner surface of water pouring pipe or clogging of a strainer.

This correction is descried below in greater detail. First, the electromagnetic valve 12 is opened and pouring of water from the water source 10 into the sand muller 1 through the digital flow meter 11 and the electromagnetic valve 12 is started. In this case, the amount of supplied water is counted by the digital flow meter 11, and when the count of the digital flow meter 11 becomes the amount obtained by subtracting the leak water amount caused by operation delay occurring when the electromagnetic valve 12 is closed from the target supplied water amount, the operation of closing the electromagnetic valve 12 is started and the water flow is stopped.

In this case, the count amount of the digital flow meter 11 obtained till the electromagnetic valve 12 is completely closed and the flow of water is stopped is compared with the target supplied water amount, and where the value obtained by subtracting the target supplied water amount from the count amount of the digital flow meter 11 is positive, this value is subtracted from the leak water amount caused by operation delay occurring when the electromagnetic valve 12 is closed in the next water pouring cycle. Where the value obtained by subtracting the target supplied water amount from the count amount of the digital flow meter is negative, this value is added to the leak water amount.

In the present embodiment, the contents of the above-described separate mixing and adjusting method suggest the presence of the following configuration. A method for mixing and adjusting foundry sand on the basis of the necessary supplied water amount corresponding to the electric resistance of the foundry sand that is to be mixed, which has been measured by the electric resistance meter 6, and the ratio of a variation in the CB value corresponding to the additionally supplied water amount, which have been determined by implementing the above-described preceding mixing and adjusting method, the method including: a weight measurement step (S22) of measuring the weight of the foundry sand that is to be mixed, with the weight meter 2; a step (S23) of measuring the electric resistance of the foundry sand that is to be mixed, with the electric resistance meter 6; a charging step (S25) of charging the foundry sand for which the weight and the electric resistance have been measured into the sand muller; a primary water pouring step (S26) of pouring water in an amount determined on the basis of the necessary supplied water amount corresponding to the electric resistance of the foundry sand that is to be mixed, which has been measured by the electric resistance meter 6, into the foundry sand charged into the sand muller; a primary supplied water mixing step (S27) of mixing the foundry sand subjected to the primary water pouring; a CB value measurement step (S28) of measuring the CB value of the mixed sand subjected to the primary supplied water mixing with the CB value measuring means 7; a variation ratio calculation step of calculating a difference between the CB value of the mixed sand subjected to the primary supplied water mixing and the target CB value as a ratio of a variation in the CB value when the measured CB value of the mixed sand is equal to or less than the lower limit value of the target CB value range; an (S33) additional water pouring step of determining an additionally supplied water amount corresponding to the calculated ratio of a variation in the CB value on the basis of the ratio of a variation in the CB value corresponding to the additionally supplied water amount and additionally pouring water in the determined additionally supplied water amount into the mixed sand; and an additionally supplied water mixing step (S34) of mixing again the mixed sand subjected to the additional water pouring.

The advantage of the present configuration is that accurate amounts of water can be supply in the primary water pouring and additional water pouring, the number of water pouring cycles can be minimized, and the mixed sand within the target CB value range can be obtained within a short period of time.

Further, in the above-described separate mixing and adjusting method, where the weight of the foundry sand that is charged from the sand metering hopper 3 into the sand muller 1, that is, the weight of the foundry sand that is to be mixed, changes, the amount of water supply in the primary water pouring step (S26) and the amount of water supply in the additional water pouring step (S33) are made proportional to the weight of the foundry sand that is to be mixed, which has been measured by the weight meter 2. In this case the advantage is that water can be supply in the amount corresponding to the weight of the sand charged into the sand muller 1 even when this weight changes, and the mixed sand within the target CB value range can be obtained within a short period of time.

Further, in the present embodiment, as indicated in the above-described separate mixing and adjusting method, the necessary supplied water amount corresponding to the electric resistance of the foundry sand that is to be mixed, which has been measured by the electric resistance meter 6, is corrected by the difference between the measured CB value of the mixed sand subjected to the primary supplied water mixing, which has been measured by the CB value measuring means 7, and the estimated CB value of the mixed sand subjected to the primary supplied water mixing, which is determined on the basis of the necessary supplied water amount corresponding to the electric resistance of the foundry sand that is to be mixed, which has been measured by the electric resistance meter 6.

The advantage of the present configuration is that the necessary supplied water amount corresponding to the electric resistance of the foundry sand can be corrected for each mixing operation according to the state of the detection unit of the electric resistance meter 6 or property fluctuations of the reclaimed sand that depend on the shape and weight of the casting to be produced and the amount of the core used. Therefore, accurate primary water pouring can be performed and the mixed sand within the target CB value range can be obtained within a short period of time.

Further, in the present embodiment, as indicated in the above-described separate mixing and adjusting method, the intercept and inclination of the function of the necessary supplied water amount versus the electric resistance of the foundry sand that is to be mixed, which has been measured by the electric resistance meter 6, are corrected upon the correction of the necessary supplied water amount corresponding to the electric resistance of the foundry sand that is to be mixed, which has been measured by the electric resistance meter 6. The advantage of the present configuration is that even more accurate primary water pouring can be performed and the mixed sand within the target CB value range can be obtained within a short period of time.

Further, in the present embodiment, as indicated in the above-described separate mixing and adjusting method, the following steps are included: an additional CB value measurement step (S35) of measuring the CB value of the mixed sand subjected to the additionally supplied water mixing with the CB value measuring means 7; a variation ratio calculation step of calculating the ratio of a variation in the measured CB value of the mixed sand caused by the additionally supplied water; an average value calculation step of determining an average value of the ratios of variations in the measured CB value of the mixed sand caused by the additionally supplied water that have heretofore been calculated; and a correction step (S36) of correcting the ratio of a variation in the CB value corresponding to the additionally supplied water amount by a difference between the average value of the ratios of variations in the measured CB value of the mixed sand caused by the additionally supplied water that have heretofore been calculated and the calculated ratio of a variation in the measured CB value of the mixed sand caused by the additionally supplied water.

The advantage of the present configuration is that the ratio of a variation in the measured CB value of the mixed sand caused by the additionally supplied water is corrected for each mixing operation and, therefore, accurate additional water pouring can be performed and the mixed sand within the target CB value range can be obtained within a short period of time.

Further, in the present embodiment, as indicated in the above-described separate mixing and adjusting method, a correction value for correcting the ratio of a variation in the CB value corresponding to the additionally supplied water amount is multiplied by a factor of 0.1 to 0.8. The advantage of the this feature is that where the correction value for correcting the ratio of a variation in the CB value corresponding to the additionally supplied water amount is multiplied by the aforementioned factor, abrupt changes in the ratio of a variation in the CB value corresponding to the additionally supplied water amount can be avoided and abrupt changes in the additionally supplied water amount can be avoided.

In the present embodiment, in the above-described separate mixing and adjusting method, the estimated supplied water amount is calculated from a functional graph of the necessary supplied water amount versus the electric resistance of the foundry sand that is to be mixed, which has been determined on the basis of past results of foundry sand mixing. However, when the heretofore obtained data are not available, as in the case where new mixing equipment is installed, the relationship (functional graph) between the necessary supplied water amount and the electric resistance of the foundry sand that is to be mixed can be obtained, as indicated by the tests conducted by the inventors, by taking the supplied water amount constituting 1% to 2% of the metered sand amount as the estimated supplied water amount and repeating the preceding mixing and adjusting method several times.

In the present embodiment, the electric resistance of the metered foundry sand is measured with the electric resistance meter 6, but such a configuration is not limiting, and the same effect can be obtained by measuring the electric conductivity which is the inverse value of electric resistance.

Further, in the present embodiment, the electric resistance of the foundry sand conveyed by the sand feeding belt conveyor 4 is measured by the electric resistance meter 6 provided at the upper section on the distal end side of the sand feeding belt conveyor 4, but such a configuration is not limiting, and it is also possible to dispose the electric resistance meter 6 inside the sand metering hopper 3 and measure the electric resistance of the metered foundry sand, that is, the foundry sand inside the sand metering hopper 3.

Further, in the present embodiment, the water content measuring means measures the amount changing according to the water content of the foundry sand, and the water content in the present embodiment is the value measured by the water content measuring means. The electric resistance meter 6 used in the present embodiment is an example of the water content measuring means. However, a water meter of an electrostatic capacitance type is an example of the electric water content measuring means, and an IR water meter is an example of an optical water content measuring means.

Some steps in the above-described separate mixing and adjusting method can be changed. A variation example of such a method is explained below. For the sake of convenience, the above-described separate mixing and adjusting method is referred to as the first example, and the variation example explained below is referred to as the second example.

In the second example, the electric resistance of the foundry sand that is to be mixed, which has been measured by the electric resistance meter 6, and an adjusted primary supplied water amount that is a value obtained by adding the primary supplied water amount to a value obtained by dividing a difference between the measured CB value of the mixed sand subjected to the primary supplied water mixing, which has been measured by the CB value measuring means 7, and the target CB value by the ratio of a variation in the CB value corresponding to the additionally supplied water amount are stored in a storage means (not shown in the figure) for each mixing operation. For each mixing operation, as referred to herein, means for each batch, where an operation in which the foundry sand charged from the sand metering hopper 3 into the sand muller 1 is mixed and the mixing is ended by discharging the mixed sand from the sand discharge port 1*a* is taken as a single batch.

The operation of the second example is explained below. In the second example, the steps preceding the step in which the CB value of the mixed sand subjected to the primary supplied water mixing is measured with the CB value measuring means 7 are same as those in the first example. Then, linear approximation is performed from the distribution of the electric resistance of the foundry sand that is to be mixed, which has been measured by the electric resistance meter 6, and the adjusted primary supplied water amount that have been stored in the storage means. The approximation line thus obtained can be interpreted as a graph of the "electric resistance–necessary supplied water amount function" for which the intersect and inclination have been corrected. Therefore, the intersect and inclination of the "electric resistance–necessary supplied water amount function" are corrected by performing the linear approximation and obtaining the approximation line. The "electric resistance–necessary supplied water amount function" for which the intersect and inclination have been corrected becomes effective from the mixing of the next cycle. The electric resistance of the foundry sand that is to be mixed, which has been measured by the electric resistance meter 6, and the adjusted primary supplied water amount that are used for the linear approximation are preferably the data within the range spanning back about 10 to 50 points from the newest data.

In the second example, in addition, the measured CB value (primary supplied water CB value) of the mixed sand subjected to the primary supplied water mixing, which has been measured by the CB value measuring means 7, is compared with the estimated CB value (primary supplied water estimated CB value) of the mixed sand subjected to the primary supplied water mixing, which is determined on the basis of the "electric resistance–necessary supplied water amount function". Then, the difference between the primary supplied water estimated CB value and the primary supplied water CB value is determined, and the supplied water amount corresponding to this difference in CB values is determined from the ratio ("additionally supplied water amount–CB value ratio") of variations in the CB value corresponding to the additionally supplied water amount, which has been determined in the preceding mixing and adjusting method.

Where the difference between the primary supplied water estimated CB value and the primary supplied water CB value is positive, the supplied water amount corresponding to the difference in the CB value is added to the primary supplied water amount in the mixing of the next cycle. Where the difference between the primary supplied water estimated CB value and the primary supplied water CB value is negative, the supplied water amount corresponding to the difference in CB value is subtracted from the primary supplied water amount in the mixing of the next cycle. The primary supplied water amount in the mixing of the next cycle is thus corrected. The correction value used for correcting the primary supplied water amount (amount added to or subtracted from the primary supplied water amount) is used only during the mixing of the next cycle. Further, it is preferred that the correction value used for correcting the primary supplied water amount be multiplied by a factor of 0.1 to 0.8 in order to avoid abrupt variations in the supplied water amount.

Then it is determined whether the primary supplied water CB value is within the target CB value range, in the same manner as in the first example. Subsequent steps involve the operations same as those of the first example till the very end.

The contents described in the second example suggest the presence of the following configuration: a storage step of storing in a storage means, for each batch mixing, the electric resistance of the foundry sand that is to be mixed, which has been measured by the electric resistance meter 6, and the adjusted primary supplied water amount that is a value obtained by adding the primary supplied water amount to a value obtained by dividing a difference between the measured CB value of the mixed sand subjected to the primary supplied water mixing, which has been measured by the CB value measuring means 7, and the target CB value by the ratio of a variation in the CB value corresponding to the additionally supplied water amount; and a linear approximation step of performing linear approximation from the distribution of the electric resistance of the foundry sand that is to be mixed, which has been measured by the electric resistance meter 6, and the adjusted primary supplied water amount that have been stored in the storage means.

The advantage of such a configuration is that the correction of the intersect and inclination of the "electric resistance–necessary supplied water amount function" can be performed for each batch mixing by performing linear approximation from the distribution of the electric resistance of the foundry sand that is to be mixed, which has been measured by the electric resistance meter 6, and the adjusted primary supplied water amount, accurate primary water pouring can be performed in the mixing of the next cycle on the basis of the corrected function, and the mixed sand within the target CB value range can be obtained within a short period of time.

Further, in the second example, as explained hereinabove, the primary supplied water amount during the mixing of the next cycle is corrected by the difference between the measured CB value of the mixed sand subjected to the primary supplied water mixing, which has been measured by the CB value measuring means 7, and the estimated CB value of the mixed sand subjected to the primary supplied water mixing, which is determined on the basis of the necessary supplied water amount corresponding to the electric resistance of the foundry sand that is to be mixed, which has been measured by the electric resistance meter 6. The advantage of such a configuration is that the ability to track the fluctuating properties of the reclaimed sand can be improved.

INDUSTRIAL APPLICABILITY

The present invention can be used as a mixing and adjusting method for foundry sand in which calibration performed to find the correlation between the value measured by the water sensor and the water content value measured by the evaporation-type water meter is unnecessary and no complex calibration operation should be performed by the operator or controller.

REFERENCE SIGNS LIST

1: Sand Muller
2: Weight Measuring Means
6: Water Content Measuring Means
7: CB Value Measuring Means
9: Water Pouring Means
10: Water Source
11: Digital Flow Meter
12: Electromagnetic Valve

The invention claimed is:

1. A mixing and adjusting method for foundry sand that uses a sand muller for the foundry sand, the method comprising:

measuring a weight of the foundry sand before the foundry sand is charged into the sand muller;

measuring an electric resistance of the foundry sand before the foundry sand is charged into the sand muller;

charging the foundry sand into the sand muller;

calculating an estimated supplied water amount based, at least in part, on a predetermined amount of water associated with the electric resistance of the foundry sand, and pouring primary water in an amount less than the estimated supplied water amount into the foundry sand charged into the sand muller;

mixing the foundry sand with the primary water to obtain first mixed sand;

measuring a first compactability (CB) value of the first mixed sand;

when the first CB value is equal to or less than a lower limit value of a target CB value range, pouring additional water into the first mixed sand, wherein an amount of the additional water is less than a difference between the estimated supplied water amount and an amount of water supplied before measuring the first CB value;

mixing the first mixed sand with the additional water to obtain second mixed sand; and measuring a second CB value of the second mixed sand, wherein pouring the additional water, mixing the first mixed sand with the additional water, and measuring the second CB value are repeated until the second CB value becomes larger than the lower limit value;

a total supplied water amount until the second CB value becomes larger than the lower limit value is calculated, and the total supplied water amount is determined as the predetermined amount of water; and a ratio of a variation in the CB value corresponding to the additionally supplied water amount is determined from the additionally supplied water amount during the additional water pouring and the second CB value.

2. The mixing and adjusting method for foundry sand according to claim 1, wherein an amount of water supplied in one cycle decreases as a number of water pouring cycles increases after the additional water pouring has been performed after the primary water pouring.

3. The mixing and adjusting method for foundry sand according to claim 2, wherein when water is supplied into the foundry sand, a leak water amount is corrected for each end of water pouring operation by a difference between a target amount of water that is to be supplied through a digital flow meter communicated with a water source and an accumulated flow rate measured by the digital flow meter, and the leak water amount is caused by operation delay occurring when an electromagnetic valve communicated with the digital flow meter is closed.

4. The mixing and adjusting method for foundry sand according to claim 1, wherein when water is supplied into the foundry sand, a leak water amount is corrected for each end of water pouring operation by a difference between a target amount of water that is to be supplied through a digital flow meter communicated with a water source and an accumulated flow rate measured by the digital flow meter, and the leak water amount is caused by operation delay occurring when an electromagnetic valve communicated with the digital flow meter is closed.

5. A mixing and adjusting method for foundry sand that uses a sand muller for the foundry sand, the method comprising:

measuring a weight of the foundry sand before the foundry sand is charged into the sand muller;

measuring an electric resistance of the foundry sand before the foundry sand is charged into the sand muller;

charging the foundry sand into the sand muller;

determining a primary supplied water amount based, at least in part, on a first relationship between a predetermined amount of water and the electric resistance of the foundry sand, and pouring primary water in the primary supplied water amount into the foundry sand charged into the sand muller;

mixing the foundry sand with the primary water to obtain first mixed sand;

measuring a compactability (CB) value of the first mixed sand;

when the CB value is equal to or less than a lower limit value of a target CB value range, calculating a difference between the CB value and a target CB value as a CB difference;

determining an additionally supplied water amount corresponding to the CB difference based, at least in part, on a second relationship between a ratio of a variation in the CB value and the additionally supplied water amount, and pouring additional water in the additionally supplied water amount into the first mixed sand; and mixing the first mixed sand with the additional water to obtain second mixed sand.

6. The mixing and adjusting method for foundry sand according to claim 5, wherein the primary supplied water amount and the additionally supplied water amount are made proportional to the weight.

7. The mixing and adjusting method for foundry sand according to claim 6, wherein when water is supplied into the foundry sand, a leak water amount is corrected for each end of water pouring operation by a difference between a target amount of water that is to be supplied through a digital flow meter communicated with a water source and an accumulated flow rate measured by the digital flow meter, and the leak water amount is caused by operation delay occurring when an electromagnetic valve communicated with the digital flow meter is closed.

8. The mixing and adjusting method for foundry sand according to claim 5, wherein the first relationship is corrected by a difference between the CB value and an estimated CB value of the first mixed sand which is determined based, at least in part, on the first relationship.

9. The mixing and adjusting method for foundry sand according to claim 8, wherein the first relationship is a function indicating a relationship between the predetermined amount of water and the electric resistance of the foundry sand, and an intercept and an inclination of the function are corrected upon the correction of the first relationship.

10. The mixing and adjusting method for foundry sand according to claim 9, wherein when water is supplied into the foundry sand, a leak water amount is corrected for each end of water pouring operation by a difference between a target amount of water that is to be supplied through a digital flow meter communicated with a water source and an accumulated flow rate measured by the digital flow meter, and the leak water amount is caused by operation delay occurring when an electromagnetic valve communicated with the digital flow meter is closed.

11. The mixing and adjusting method for foundry sand according to claim 8, wherein when water is supplied into the foundry sand, a leak water amount is corrected for each end of water pouring operation by a difference between a target amount of water that is to be supplied through a digital flow meter communicated with a water source and an accumulated flow rate measured by the digital flow meter, and the leak water amount is caused by operation delay occurring when an electromagnetic valve communicated with the digital flow meter is closed.

12. The mixing and adjusting method for foundry sand according to claim 5, wherein the CB value of the first mixed sand comprises a first CB value, and wherein the method further comprises measuring a second CB value of the second mixed sand;

calculating a CB value variation ratio that is a ratio of a variation in the second CB value;

determining an average value of CB value variation ratios that have heretofore been calculated; and correcting the second relationship by a difference between the average value and the CB value variation ratio.

13. The mixing and adjusting method for foundry sand according to claim 12, wherein a correction value for correcting the second relationship is multiplied by a factor of 0.1 to 0.8.

14. The mixing and adjusting method for foundry sand according to claim 13, wherein when water is supplied into the foundry sand, a leak water amount is corrected for each end of water pouring operation by a difference between a target amount of water that is to be supplied through a digital flow meter communicated with a water source and an accumulated flow rate measured by the digital flow meter, and the leak water amount is caused by operation delay occurring when an electromagnetic valve communicated with the digital flow meter is closed.

15. The mixing and adjusting method for foundry sand according to claim 12, wherein when water is supplied into the foundry sand, a leak water amount is corrected for each end of water pouring operation by a difference between a target amount of water that is to be supplied through a digital flow meter communicated with a water source and an accumulated flow rate measured by the digital flow meter, and the leak water amount is caused by operation delay occurring when an electromagnetic valve communicated with the digital flow meter is closed.

16. The mixing and adjusting method for foundry sand according to claim 5, further comprising:

performing linear approximation from a distribution of the electric resistance and an adjusted primary supplied water amount, wherein the adjusted primary supplied water amount is a value obtained by adding the primary supplied water amount to a value obtained by dividing a difference between the CB value and the target CB value by the ratio of the variation in the CB value corresponding to the additionally supplied water amount.

17. The mixing and adjusting method for foundry sand according to claim 16, wherein the primary supplied water amount during mixing of a next cycle is corrected by a difference between the CB value and an estimated CB value of the first mixed sand which is determined based, at least in part, on the first relationship.

18. The mixing and adjusting method for foundry sand according to claim 5, wherein when water is supplied into the foundry sand, a leak water amount is corrected for each end of water pouring operation by a difference between a target amount of water that is to be supplied through a digital flow meter communicated with a water source and an accumulated flow rate measured by the digital flow meter, and the leak water amount is caused by operation delay occurring when an electromagnetic valve communicated with the digital flow meter is closed.

19. A mixing and adjusting method for foundry sand that uses a sand muller for the foundry sand, the method comprising:

measuring a weight of the foundry sand before the foundry sand is charged into the sand muller;

measuring an electric resistance of the foundry sand before the foundry sand is charged into the sand muller;

charging the foundry sand into the sand muller;

calculating an estimated supplied water amount based, at least in part, on a predetermined amount of water associated with the electric resistance of the foundry sand, and pouring primary water in an amount less than the estimated supplied water amount into the foundry sand charged into the sand muller;

mixing the foundry sand with the primary water to obtain first mixed sand;

measuring a first compactability (CB) value of the first mixed sand;

when the first CB value is equal to or less than a lower limit value of a target CB value range, pouring additional water into the first mixed sand, wherein an amount of the additional water is less than a difference between the estimated supplied water amount and an amount of water supplied before measuring the first CB value;

mixing the first mixed sand with the additional water to obtain second mixed sand; and measuring a second CB value of the second mixed sand, wherein when water is supplied into the foundry sand, a leak water amount is corrected for each end of water pouring operation by a difference between a target amount of water that is to be supplied through a digital flow meter communicated with a water source and an accumulated flow rate measured by the digital flow meter, and the leak water amount is caused by operation delay occurring when an electromagnetic valve communicated with the digital flow meter is closed.

* * * * *